United States Patent
Jackson et al.

(10) Patent No.: US 6,254,722 B1
(45) Date of Patent: Jul. 3, 2001

(54) METHOD FOR MAKING DISSOLVING PULP FROM PAPER PRODUCTS CONTAINING HARDWOOD FIBERS

(75) Inventors: Larry S. Jackson; Thomas W. Joyce; John A. Heitmann, Jr., all of Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/145,718

(22) Filed: Sep. 2, 1998

Related U.S. Application Data

(62) Division of application No. 08/625,406, filed on Mar. 27, 1996, now abandoned.

(51) Int. Cl.$^7$ .................................................. D21H 11/20
(52) U.S. Cl. ..................... 162/5; 162/8; 162/72; 162/90; 435/277; 435/278
(58) Field of Search ................................. 162/72, 88, 89, 162/90, 5, 8; 435/277, 278

(56) References Cited

U.S. PATENT DOCUMENTS 5,498,534 * 3/1996 Jeffries et al. ....................... 425/278

* cited by examiner

*Primary Examiner*—Steve Alvo
(74) *Attorney, Agent, or Firm*—Jenkins and Wilson P.A.

(57) ABSTRACT

A method for making dissolving pulp from cellulosic fiber. The fiber is treated with a 3-stage sequence having a first alkali extraction stage, a xylanase treatment stage, and a second alkali extraction stage. Having the xylanase treatment stage sandwiched between 2 alkali extraction stages results in the dissolving pulp exhibiting both a very low xylan content of about 2.6% by weight or less and a very low mannan content of about 1.5% by weight or less. The low contents of these 2 components cannot be achieved with comparison treatments of only an alkali extraction stage, only a xylanase treatment stage, or only 2 stages of a xylanase treatment stage and an alkali extraction stage.

12 Claims, No Drawings

METHOD FOR MAKING DISSOLVING PULP FROM PAPER PRODUCTS CONTAINING HARDWOOD FIBERS

RELATED APPLICATIONS

This application is a Divisional of applicants' application Ser. No. 08/625,406 filed Mar. 27, 1996, now abandoned.

TECHNICAL FIELD

The present invention relates, in general, to a method for making dissolving pulp, also known in the art as chemical cellulose. More particularly, the present invention relates to a method for making dissolving pulp from cellulose fiber by treating the fiber with a 3-stage sequence of: (1) alkali extraction, (2) xylanase modification, and (3) alkali extraction, and relates to the dissolving pulp made by the method.

BACKGROUND OF THE INVENTION

Cellulose, which is obtained from various types of wood, has many uses. One use, as is well known in the art, is to convert the cellulose in the presence of acetic anhydride, acetic acid, and sulfuric acid, into the triacetate, followed by partial hydrolysis of the triacetate to remove some of the acetate groups and to degrade the chains into smaller fragments of about 200–300 units each, in order to yield the commercially important product, cellulose acetate.

Cellulose acetate is not as flammable as cellulose nitrate, and hence, has replaced the nitrate in many of its applications. For instance, cellulose acetate is used in the manufacture of photographic film, as well as in the manufacture of filaments used in the textile industry.

Commercially available dissolving pulps have a high content of about 90–98% cellulose (also known as the content of glucan, a polymer containing repeating units of glucose), a low content of hemicelluloses (e.g., mannan or xylan), very little residual lignin, a low extractive and mineral content, a high brightness, and preferably, a uniform molecular weight distribution. Thus, due to the high cellulose content, the major use of dissolving pulps is in the manufacture of cellulose acetate although there are other uses.

Today, most dissolving pulps are derived from wood using the acid sulfite process or the prehydrolysis kraft process. The objective in using these processes to make dissolving pulps from cellulose is to remove or to degrade both lignin and hemicelluloses to enhance their removal by alkali extraction.

More particularly, the acid sulfite process uses a higher temperature and higher acidity as compared to cooking conditions for producing paper products. On the other hand, the prehydrolysis kraft process applies an acidic pretreatment before the alkaline pulping stage in order to degrade the hemicelluloses, consequently allowing for their easier removal during the cook. Cold alkali extraction in a subsequent bleaching sequence can remove residual hemicelluloses to obtain pulp grades for high quality end uses.

In softwoods, cold alkali extraction of prehydrolysis kraft pulps can achieve pulps with mannan levels of approximately 1%, whereas cold alkali extraction of hardwood pulps can reach mannan and xylan levels of approximately 0.5% and 1%, respectively. Low levels of these 2 hemicelluloses are desirable because as the levels both become higher, for instance if the mannan is above about 1.6% or if the xylan is above about 2.7%, a milky or cloudy appearance occurs in the cellulose acetate. For uses of dissolving pulps other than in the manufacture of cellulose acetate, the cloudiness is of less importance and may not be a factor at all, so that a mannan content of 1.5% and a xylan content of 2.6% in dissolving pulps may be acceptable.

In contrast to the prehydrolysis kraft process for making dissolving pulps, the conventional kraft process stabilizes residual hemicelluloses against further alkali attack. This stabilization prevents the production of acceptable quality dissolving pulps through treatment in the bleach plant.

Several decades ago, cold alkali extraction of softwood kraft pulps had been used to produce dissolving grade pulps. Nitration grade pulps (i.e., those employed in the production of the above-noted more flammable cellulose nitrate) were produced in Sweden and Australia as early as the 1930's, as well as having been produced in the United States during World War II. See, for instance, "Chemical Cellulose from Radiata Pine Kraft Pulp", Wallis et al., Vol. 43, No. 5, *Appita*, p. 355 (1990).

As also reported by Wallis et al. in "Chemical Cellulose from Radiata Pine Kraft Pulp", bleached radiata pine kraft pulps and radiata pine bisulfite pulps have been converted to nitration grade dissolving pulps. Such conversions have also been reported by Evans et al., in an article entitled "CEH Bleached Radiata Pine Bisulfite Pulp as a Source of Chemical Cellulose", published in Vol. 43, No. 2, *Appita*, pp. 130–136 (1990). More particularly, both groups reported that cold alkali extraction of the bleached pulps with 8–10% NaOH for 1 hour at 20° C. gave products with satisfactory chemical properties for nitration grade cellulose. However, this approach of a cold alkali extraction is not applicable to making dissolving pulp suitable for the manufacture of acetylation grade cellulose due to the presence of a resistant xylan fraction remaining after the cold alkali extraction, as also reported by Wallis et al. in "Chemical Cellulose from Radiata Pine Kraft Pulp". As noted above, a high level of the hemicellulose, xylan, is undesirable due to its causing a cloudy appearance in the cellulose acetate.

During the last decade or so, various studies have focused on removing or modifying hemicellulose in bleached chemical fiber with xylanases. For instance, as reported by Paice et al. in "Removing Hemicellulose from Pulp by Specific Enzyme Hydrolysis", Vol. 4, No. 2, *J. of Wood Chem. and Tech.*, p. 187 (1984), xylan was removed from bleached hardwood sulfite pulp with a xylanase preparation from *Schizophyllum commune*. The xylanase was not very effective in removing xylan from the bleached fiber as only a small decrease in pentosan content was reported.

Similarly, Senior et al., as reported in Vol. 10, No. 12, *Biotechnology Letters*, pp. 907–912 (1988), performed a study using bleached hardwood kraft pulp and a xylanase from *Trichoderma harzianum*. Although they observed a 50% decrease in the xylan content of the pulp, the final product still contained a high xylan level that was unacceptable. Apparently, the bleaching process either removed the more accessible hemicelluloses or the modification of the hemicelluloses during pulping produced polysaccharides not recognized by the enzyme.

Additionally, as reported by Mora et al. in "Action of Xylanases on Chemical Pulp Fibers: Part I: Investigations on Cell Wall Modifications", Vol. 6, No. 2, *J.of Wood Chem. and Tech.*, pp. 147–165 (1986) and by Noe et al. in "Action of Xylanases on Chemical Pulp Fibers: Part II: Enzymatic Beating", Vol. 6, No. 2, *J. of Wood Chem. and Tech.*, p. 167–184 (1986), the modification of chemical fibers with xylanases was studied. Mora et al. suggested that xylans are more widely hydrolyzed in the fiber cell wall than is suggested by the hydrolysis rate based upon the release of soluble sugars. More particularly, they concluded that the sugar products do not account for xylan hydrolysis in the fiber cell wall where the polysaccharide is physically retained through hydrogen bonding.

The Mora et al. study was extended by Noe et al. in order to determine whether xylan modifications in the fiber cell wall by xylanases affected paper properties. They reported not only that both bleached kraft birchwood pulp and bleached sulfite spruce pulp demonstrated enhanced beatability and fiber flexibility with a reduction of fiber intrinsic strength due to hydrolysis of xylan, but also that these modifications occurred with only a slight yield loss.

Similar findings have been reported by Roberts et al. in "Modifications of Paper Properties by Treatment of Pulp with *Saccharomonospora viridis* Xylanase", Vol. 12, No. 3, *Enzyme Microb. Technol.,* pp. 210–213 (March, 1990). Roberts et al. found that xylanase treatment of bleached kraft birchwood pulp resulted in a decrease (25–30%) in burst strength and breaking length with a slight loss (4%) in zero span breaking length. However, the xylan removal was only a low level of 20%, which was attributed by Roberts et al. to poor enzyme accessibility to xylan located in fiber pores.

In contrast, the xylanase method of the present invention overcomes the prior art problems described above in that the resultant dissolving pulp has both a desirably low level of xylan and a desirably low level of mannan.

SUMMARY OF THE INVENTION

Accordingly, the present invention provides a method for making dissolving pulp from a cellulosic fiber source, preferably containing hardwood fiber. The method comprises treating the fiber source with a 3-stage sequence. The sequence includes a first alkali extraction stage, a xylanase treatment stage, and a second alkali extraction stage. Each of the first and the second alkali extraction stages is conducted with aqueous sodium hydroxide at a temperature of about 0° C. to about 23° C., and the xylanase stage is conducted at a temperature of about 40° C. to about 70° C.

Also, each of the 3 stages is conducted for a sufficient time and the xylanase stage is conducted with a charge of sufficient units of activity of xylanase per gram of fiber source to obtain a dissolving pulp. Preferably, the dissolving pulp has certain desirable properties. These properties are: (i) a resistance of about 97.0% or greater to extraction with 10% sodium hydroxide in water, (ii) a xylan content of about 2.6% or less by weight, (iii) a mannan content of about 1.5% or less by weight, and (iv) a cuene viscosity of about 7.5 or greater centipoise.

Additionally, the present invention provides a pulp comprising dissolving pulp made by the method described in the above 2 paragraphs.

Therefore, it is an object of the present invention to make high quality dissolving pulp having both a low xylan and a low mannan content so that when the pulp is used to manufacture cellulose acetate, it will have little or no cloudy appearance.

An object of the invention having been stated above, other objects will become evident as the description proceeds when taken in connection with the laboratory examples as best described below.

DETAILED DESCRIPTION OF THE INVENTION

In accordance with the present invention, a method has been found for treating a cellulosic fiber source in order to obtain dissolving pulp, also known as chemical cellulose. Desirably, the fiber source includes, but is not limited to, the group consisting of hardwood fiber, a mixture of hardwood fiber and softwood fiber, recycled paper products made from hardwood fiber, recycled paper products made from a mixture of hardwood fiber and softwood fiber, other cellulosic fiber (such as straw), and combinations thereof. Thus, preferably, the fiber source contains hardwood fiber, and more preferably, the fiber source contains only hardwood fiber, and no softwood fiber is present.

Accordingly, the method may be applied to an original source of fiber that contains only hardwood fiber. An example of such a source is wood from trees that is converted into kraft fiber, i.e., commercial bleached hardwood kraft fiber.

Furthermore, the method may be applied to an original source of softwood fiber, i.e., from pine trees, but, softwood has a much higher mannan level than hardwood does. Thus, in addition to a xylanase treatment, a mannanase treatment may be needed, in order to obtain high quality dissolving pulp with a desirably low mannan level so that cellulose acetate made from the dissolving pulp does not have a milky appearance.

Accordingly, and very importantly, the method may be applied to a fiber source comprising recycled paper products, for instance waste paper from envelope clippings (unprinted or de-inked) and ledger paper (unprinted or de-inked), which waste paper often is partly of softwood fiber, and yet, very often, no mannanase treatment, in addition to the xylanase treatment, will be needed. Hence, as is illustrated in Example 4 below, the fiber source treated in accordance with the method of the present invention need not be 100% hardwood fiber, and may be recycled paper products that also contain softwood fiber.

Since the method of the present invention is suitable for application to waste paper, the present method may, for instance, be coupled to the kraft recovery system of a mill containing a recycling wash de-inking facility and/or a de-inking facility utilizing high quality waste paper rich in hardwood fiber.

The method of the present invention involves 3 stages that are performed in sequence as follows.

First, the fiber source is subjected to an extraction with aqueous sodium hydroxide (hereinafter, NaOH) in order to remove or degrade hemicelluloses. The extraction should be performed at temperature of about 23° C. or lower but not lower than the temperature at which water freezes of 0° C., more preferably in the cold from about 21° C. to about 19° C., and most preferably in the cold at about 20° C. Thus, the term "cold" as used herein in connection with alkali extraction is intended to mean that the alkali extraction is performed at a temperature of about 21° C. or lower down to about 0° C.

The alkali extraction stage is to be conducted for a time sufficient so that after the 3 stages, a resultant dissolving pulp, preferably with the desired properties as described below, is obtained. More particularly, the extraction should be performed for about 0.5 hour to about 2.0 hours, more preferably for about 0.7 hour to about 1.5 hours, and most preferably for about 0.9 hour to about 1.1 hours.

The aqueous NaOH for the alkali extraction stage should be from about 5% to about 15% by weight NaOH in water, and more preferably from about 7% to about 12% by weight NaOH in water. Most preferably, the aqueous NaOH should be about 8% to about 10% by weight NaOH in water.

It is also contemplated that the alkali extraction may be performed at medium fiber consistency, i.e., about 10% to about 12% solids, to reduce effluent volume. Thus, such a system would be essentially effluent free since the waste streams for the present method would most likely be suitable for recovery and hence re-used instead of being disposed of as effluent.

After the first alkali extraction stage, next is performed a xylanase treatment stage. After the first alkali extraction stage, if that stage is performed in the preferred manner at or below 23° C., the resultant will still be cold when the xylanase treatment stage begins, but is not maintained in the cold. Rather, heat is applied to raise the temperature either prior to or immediately after beginning the xylanase treatment stage. The temperature for conducting the xylanase treatment stage should be at least about 40° C. up to about 70° C. More preferably, the temperature should be between about 50° C. and about 60° C., and most preferably at about 55° C. to about 60° C. The pH may be somewhat acidic to neutral from about pH=5.0 to pH=7.0, but should be slightly basic and thus above pH=7.0, with about pH=7.5 being preferred. The pulp consistency should be under about 10%, more preferably under about 5%, and most preferably about 3%.

Any microbial source that produces the enzyme, xylanase, such as those microorganisms mentioned above, is suitable for obtaining xylanase. Preferred is the xylanase preparation employed in the laboratory examples set out below, which is a commercial blend of xylanases marketed for pulp bleaching under the trade name IRGAZYME 40S by Ciba-Geigy of Greensboro, N.C. The charge of xylanase should be of sufficient units of activity of xylanase per gram of fiber source in order to obtain a resultant dissolving pulp, preferably with the desired properties as described below. Desirably, the charge should be from about 100 to about 800 units of activity of xylanase per gram of fiber source, more preferably about 150 to about 750 units.

The xylanase treatment stage should be conducted for a time sufficient to obtain a resultant dissolving pulp, preferably with the desired properties as described below. The time should be about 0.5 hour to about 3.5 hours, more preferably for about 0.8 hour to about 3.2 hours, and most preferably for about 1 hour to 3 hours.

As can be seen from the laboratory data reported below, longer times, for instance 24 hours for the xylanase treatment stage, may be employed and the resultant dissolving pulp obtained after the 3 stages will have the desired properties, except that the viscosity will be undesirably low. For instance, see the viscosity results of 4.3 and 3.8 centipoise reported in Tables 1B1 and 1B2 for the resultant dissolving pulp when the xylanase treatment stage was performed for 24 hours. A viscosity of at least 7.5 centipoise is desirable, and hence, it has been found that there is no commercial advantage in conducting the xylanase treatment stage for a long time of 24 hours.

The third stage is a second alkali extraction stage that follows the xylanase treatment stage. The second alkali extraction stage may be performed under the exact same conditions as the first alkali extraction stage, but does not have to be so performed. Rather, the second alkali extraction stage should be performed for a time sufficient and under conditions for the variations of the ranges discussed above in connection with the first alkali extraction stage in order to obtain a dissolving pulp, preferably with the desirable properties as noted below. For instance, the first alkali extraction stage may be conducted with 8% NaOH and the second alkali extraction stage may be conducted with 10% NaOH.

It has been found that the above-described 3-stage treatment with a xylanase treatment stage sandwiched between a first alkali extraction stage and a second alkali extraction stage results in a dissolving pulp. Preferably, the dissolving pulp has a desirably low xylan content of about 2.6% or lower by weight, more preferably about 2.3% or lower by weight, and most preferably about 2.0% or lower by weight. Concomitant with the low xylan content, the dissolving pulp preferably has a resistance of about 97.0% or greater to extraction with 10% NaOH in water. Preferably, the mannan content is also desirably low and should be about 1.5% or lower by weight, more preferably about 1.3% or lower by weight, and most preferably about 1.0% or lower by weight. Most preferably, the dissolving pulp has both a xylan content of 2.6% or lower and a mannan content of 1.5% or lower.

As can be seen from a review of the comparative data in the laboratory examples below, from an alkali extraction stage alone, from a xylanase treatment stage alone, or from a treatment with only 2 stages of a xylanase treatment stage and an alkali extraction stage, a dissolving pulp having both a desirably low xylan content (about 2.6% or lower) and a desirably low mannan content (1.5% or lower) cannot be obtained, although a desirably low content of one or the other can be obtained.

Additionally, the resultant dissolving pulp should have a desirably high cuene viscosity of about 7.5 centipoise or higher, more preferably about 8.5 centipoise or higher, and most preferably about 9.0 centipoise or higher. As is well known in the pulping art, higher viscosities are desirable.

Moreover, the resultant dissolving pulp should have a glucan content from about 90 to about 98% by weight, and may have a glucan content as high as 99.5% by weight. The solubility in 10% NaOH should be about 0.5% or lower for the resultant dissolving pulp, and the yield should be about 74% or better.

Thus, in general, the present method, when coupled, as noted above, to the kraft recovery system of a mill to provide a source of washed and/or de-inked fiber from recycled waste paper proceeds as follows. High quality waste paper is washed or de-inked, and then subjected to a first alkali extraction stage. Then, the resultant is washed with water, followed by a weak acid wash. Next, the pH is adjusted, preferably to 7.5, and the xylanase treatment stage is performed with heat. As known in the art of pulp processing, a thickener device for de-watering, such as a decker, may be employed, and then, the second alkali extraction stage is performed. The waste stream from the second alkali extraction stage may be recycled back to the first alkali extraction stage. The pulp product from the second alkali extraction stage is washed with water, followed by a weak acid wash in order to remove metal ions and to obtain the dissolving pulp, preferably with the above noted desired properties. The waste from the washes of the pulp may be recycled back to the wash performed after the first alkali extraction stage.

LABORATORY EXAMPLES

The following abbreviations are employed throughout the laboratory examples.

| Abbreviations | |
| --- | --- |
| NaOH | sodium hydroxide |
| OD | oven dried |
| R10 | resistance to extraction by 10% NaOH |
| S10 | solubility in 10% NaOH |
| S18 | solubility in 18% NaOH |

-continued

| Abbreviations | |
|---|---|
| U | units of xylanase |
| cp | centipoise |
| Glc | glucan, measured as % glucose after acid hydrolysis |
| Xyl | xylan, measured as % xylose after acid hydrolysis |
| Man | mannan, measured as % mannose after acid hydrolysis |
| g | gram |
| hrs | hours |
| hr | hour |
| ° C. | degrees Centigrade |
| BHWK | bleached hardwood kraft |
| HPLC | high pressure liquid chromatography |
| ml | milliliter |
| Vis | cuene viscosity |
| NT | not tested |
| % | percent |

The following materials and procedures were used in the laboratory examples.

Bleached hardwood kraft fiber was obtained in dry sheets having 7% moisture and 0.01% ash. The sheets were dried once to a constant weight at 105° C. in an oven, according to the procedure of Bhat et al., as reported in "Novel Techniques for Enhancing the Strength of Secondary Fiber", Vol. 74, No. 9, TAPPI Journal, pp. 151–157 (September, 1991). Such once dried fiber has been shown to behave in a manner similar to recycled chemical fiber, according to Bhat et al. A portion was dispersed into distilled deionized water, and then centrifuged and fluffed. A second portion was beaten, i.e., refined to a Canadian standard freeness of 200 ml according to TAPPI Method T 200. Also, unprinted white envelope clippings having 4.5% ash and unprinted white ledger paper having 11.0% ash were disintegrated according to TAPPI Method T 205.

Each of the 2 waste papers and the beaten BHWK fiber was then screened to create fractions with a Bauer-McNett classifier according to TAPPI Method T 233 to remove fines or fillers. Fractions were separated and those larger than 100 mesh were collected, mixed, centrifuged, and fluffed. Yields after fractionation for the BHWK, envelope, and ledger fibers were 60%, 77%, and 58%, respectively. Ash contents for the washed envelope and the ledger fibers were 0.3% and 0.01%, respectively.

The 2 purposes for removal of fines or fillers were (1) to eliminate a variable that could cause a loss of R10 due to damaged fiber particles and (2) to allow for increased availability of the xylanase to the fiber surfaces, according to the procedure reported by Jackson et al. in "Enzymatic Modifications of Secondary Fiber", Vol. 76, No. 3, TAPPI Journal, p. 147–54 (March, 1993).

The xylanase preparation employed was a commercial blend of xylanases marketed under the trade name IRGAZYME 40S by Ciba-Geigy of Greensboro, N.C. for pulp bleaching. Activity of the IRGAZYME 40S on oat spelt xylan was 7000 U/ml, according to the procedure of Prasad et al., as reported in "Enzyme Deinking of Black and White Letterpress Printed Newsprint Waste", Vol. 1, No. 3, Prog. in Paper Recyc., p. 21–30 (May, 1992). The xylanase was charged on the basis of units of activity per OD gram of envelope clippings, white ledger, or once dried BHWK fiber. The reaction conditions were 3% pulp consistency, pH=7.5, and 60° C. The reaction times were 1 hour, 3 hours, or 24 hours for the xylanase treatment stage.

Each of the first and the second alkali extraction stages was performed at 20° C. for 1 hour with either 8% or 10% NaOH by weight in water. Pulp consistency was 3% to allow complete dispersion of the fiber in the caustic solution, although, as noted above, the alkali extraction stages could be performed at about 10% to about 12% consistency in order to reduce effluent volume. The extracted pulp was washed with distilled water until the filtrate exhibited a neutral pH. The pulp was then washed with water adjusted with sulfuric acid to pH=3.0 in order to remove metal ions, i.e., Na+, according to the procedure of Hinck et al., as reported in "Dissolving Pulp Manufacture", edited by Ingruder et al., TAPPI Press, Atlanta, pp. 215 et seq. (1985), and the procedure of Wallis et al., as reported in "Chemical Cellulose from Radiata Pine Kraft Pulp", Vol. 43, No. 5, Appita, pp. 355–358 (September, 1990).

Carbohydrate analysis was performed on the starting material or on the resultant pulp in order to determine by HPLC the percentage of glucan, xylan, and mannan after acid hydrolysis conversion to glucose, xylose, and mannose, respectively, according to the method of Laver et al., as reported in "Determination of Carbohydrates in Wood and Pulp Products", Vol. 76, No. 6, TAPPI Journal, p. 155 et seq. (1993).

For the starting materials or the resultant pulps, alkali solubilities (R10, S10, or S10–S18) were determined according to TAPPI Method T 235, cuene viscosities were measured according to TAPPI Method T 230, and ash contents were measured according to TAPPI Method T 211.

EXAMPLE 1

Comparisons/BHWK

Samples 1A1 and 1A2. Samples were tested to investigate the feasibility of producing dissolving pulp from bleached hardwood kraft fiber that had been oven dried once to a constant weight at 105° C. The properties, prior to treatment, of the BHWK that was unrefined fiber from all fractions and of the BHWK that was refined fiber from fractions over 100 mesh were as follows:

| Properties of BHWK Fiber Prior to Treatment | | |
|---|---|---|
| | Unrefined All Fractions | Refined Fractions > 100 mesh |
| % Glc | 83.3 | 84.1 |
| % Xyl | 16.5 | 15.6 |
| % Man | 0.2 | 0.3 |
| Vis cp | 19.7 | 22.6 |
| % R10 | 91.0 | 90.4 |
| % S10–S18 | 3.3 | 2.8 |
| % S18 | 5.7 | 7.0 |
| Yield | 100 | 100 |

Selected treatments of only 1 stage or only 2 stages were effected on samples of BHWK fiber as follows: (1) a xylanase treatment stage, (2) an alkali extraction stage with 8% NaOH, (3) an alkali extraction stage with 10% NaOH, (4) a xylanase treatment stage, followed by an alkali extraction stage with 8% NaOH, or (5) a xylanase treatment stage, followed by an alkali extraction stage with 10% NaOH. For all samples in which a xylanase treatment stage was performed, the xylanase charge was held constant at 2500 U/g OD fiber for a reaction time of 24 hours. The xylanase was applied in large excess for a long time to ensure an observable effect.

The properties of the resultant pulps are summarized below in Table 1A1 (in which the BHWK was unrefined fiber from all fractions) and of Table 1A2 (in which the BHWK was refined fiber that was screened so that fractions over 100 mesh were employed).

TABLE 1A1

(Comparisons)*
Properties of Pulp after Selected Stage(s) of Treatment

| | Type of Treatment | | | | |
|---|---|---|---|---|---|
| | Xylanase | 8% NaOH | 10% NaOH | Xylanase/ 8% NaOH | Xylanase/ 10% NaOH |
| % Glc | 84.9 | 89.8 | 89.3 | 92.8 | 91.6 |
| % Xyl | 14.9 | 9.8 | 10.4 | 6.8 | 8.1 |
| % Man | 0.2 | 0.4 | 0.3 | 0.4 | 0.3 |
| Vis cp | 12.9 | 23.0 | 21.3 | 17.1 | 16.0 |
| % R10 | 88.7 | 98.0 | 98.5 | 98.1 | 98.8 |
| % S10–S18 | 4.6 | 0.9 | 0.4 | 0.8 | 0.4 |
| % S18 | 6.7 | 1.1 | 1.1 | 1.2 | 0.8 |
| % Yield | 96.7 | 87.5 | 88.7 | 84.2 | 82.9 |

*(Fiber = BHWK, unrefined -- all fractions, dried to constant weight at 105° C.; xylanase charge = 2500 U/g of fiber for 24 hrs)

TABLE 1A2

(Comparisons)*
Properties of Pulp after Selected Stage(s) of Treatment

| | Type of Treatment | | | | |
|---|---|---|---|---|---|
| | Xylanase | 8% NaOH | 10% NaOH | Xylanase/ 8% NaOH | Xylanase/ 10% NaOH |
| % Glc | 85.9 | 91.7 | 90.5 | 94.9 | 93.6 |
| % Xyl | 13.8 | 7.9 | 9.2 | 4.7 | 6.1 |
| % Man | 0.3 | 0.4 | 0.3 | 0.4 | 0.3 |
| vis cp | 10.8 | 25.2 | 23.8 | 11.2 | 14.0 |
| % R10 | 87.7 | 98.1 | 98.5 | 97.7 | 98.7 |
| % S10–S18 | 4.1 | 0.6 | 0.5 | 1.0 | 0.4 |
| % S18 | 8.3 | 1.3 | 1.0 | 1.4 | 1.0 |
| % Yield | 98.2 | 89.2 | 90.8 | 84.3 | 84.5 |

*(Fiber = BHWK, refined -- fractions > 100 mesh, dried to constant weight at 105° C.; xylanase charge = 2500 U/g of fiber for 24 hrs)

As can be seen from reviewing the data in Tables A1 and A2, performing only 1 stage or performing only 2 stages for the treatment of the hardwood kraft fiber resulted in unacceptably high xylan levels, far above the desirable 2.6% or below.

Samples 1B1 and 1B2. BHWK fiber that was once dried to a constant weight at 105° C. was employed for these samples. The fiber was subjected to a 3-stage treatment comprising a first alkali extraction stage, followed by a xylanase treatment stage, followed by a second alkali extraction stage. For the xylanase treatment stage, the xylanase charge was 2500 U/g of fiber for 24 hours. The experiment was performed using 8% NaOH for both the first and second alkali extraction stages of the 3-stage treatment, and then, the experiment was repeated, but using 10% NaOH for both the first and second alkali extraction stages of the 3-stage treatment.

The results are summarized in Table 1B1 (in which the fiber was unrefined so that all fiber fractions were employed) and Table 1B2 (in which the fiber was refined and screened so that only fractions greater than 100 mesh were employed).

TABLE 1B1

(Comparisons)*
Properties of Pulp after 3-Stage Treatment

| | Type of Treatment | |
|---|---|---|
| | 8% NaOH/ Xylanase/ 8% NaOH | 10% NaOH/ Xylanase/ 10% NaOH |
| % Glc | 97.0 | 97.8 |
| % Xyl | 2.5 | 1.8 |
| % Man | 0.5 | 0.4 |
| Vis cp | 4.3 | 3.8 |
| % R10 | 96.1 | 98.0 |
| % S10–S18 | 2.5 | 0.9 |
| % S18 | 1.4 | 1.2 |
| Yield | 75.2 | 71.2 |

*(Fiber = BHWK, unrefined -- all fractions, dried to constant weight at 105° C.; xylanase charge = 2500 U/g of fiber for 24 hrs)

TABLE 1B2

(Comparisons)*
Properties of Pulp after 3-Stage Treatment

| | Type of Treatment | |
|---|---|---|
| | 8% NaOH/ Xylanase/ 8% NaOH | 10% NaOH/ Xylanase/ 10% NaOH |
| % Glc | 97.4 | 98.2 |
| % Xyl | 2.1 | 1.5 |
| % Man | 0.5 | 0.3 |
| Vis cp | 4.0 | 3.6 |
| % R10 | 95.4 | 98.2 |
| % S10–S18 | 3.1 | 0.9 |
| % S18 | 1.6 | 1.0 |
| % Yield | 78.2 | 72.5 |

*(Fiber = BHWK, refined -- fractions > 100 mesh, dried to constant weight at 105° C.; xylanase charge = 2500 U/g of fiber for 24 hrs)

As can be seen from reviewing the data in Tables 1B1 and 1B2, even though employed on the fiber was a 3-stage treatment (i.e., a first alkali extraction stage, followed by a xylanase treatment stage, followed by a second alkali extraction stage), the resultant pulp exhibited a cuene viscosity of only 4.3 cp or lower, which is far below the above-mentioned desirable cuene viscosity of 7.5 cp or higher.

Accordingly, there is no advantage in increasing production costs by conducting the xylanase treatment stage for a long time, such as 24 hours, since a pulp with a viscosity of only 4.3 cp or lower is generally not useful.

Samples 1C1 and 1C2. The procedure of Samples B1 and B2 was repeated, so that the fiber was subjected to a 3-stage treatment comprising a first alkali extraction stage, followed by a xylanase treatment stage, followed by a second alkali extraction stage, except for the following.

Instead of the xylanase treatment stage being performed for 24 hours, this stage was not performed at all (i.e., the enzyme charge was 0 U/g) or was performed either for only 1 hour or for only 3 hours. When performed, the xylanase charge was either 1.4 U/g, 7 U/g, 15 U/g, or 30 U/g. Also, each of the first and second alkali extraction stages was performed with 10% NaOH and the BHWK fiber employed was always unrefined so that all fiber fractions were employed.

The results are summarized below in Table 1C1 (in which the xylanase stage was not conducted or was conducted for 1 hour) and Table 1C2 (in which the xylanase stage was conducted for 3 hours).

TABLE 1C1

(Comparisons)*
Properties of Pulp after 3-Stage Treatment

| | U/g of Charge in 1 hr Xylanase Stage | | | | |
|---|---|---|---|---|---|
| | 0 | 1.4 | 7 | 15 | 30 |
| % Glc | 93.4 | 94.8 | 94.9 | 94.8 | 96.1 |
| % Xyl | 6.4 | 5.0 | 4.9 | 4.9 | 3.6 |
| % Man | 0.2 | 0.2 | 0.2 | 0.3 | 0.3 |
| Vis cp | 24.1 | 24.5 | 24.1 | 21.7 | 22.0 |
| % R10 | 99.5 | NT | 99.5 | NT | 99.5 |
| % S10–S18 | 0.2 | NT | 0.0 | NT | 0.1 |
| % S18 | 0.3 | NT | 0.5 | NT | 0.4 |
| Yield | 82.0 | 81.0 | 80.8 | 80.7 | 79.3 |

*(Fiber = BHWK, unrefined -- all fractions, dried to constant weight at 105° C.; treatment = 10% NaOH/Xylanase/10% NaOH)

TABLE 1C2

(Comparisons)*
Properties of Pulp after 3-Stage Treatment

| | U/g of Charge in 3 hr Xylanase Stage | | | |
|---|---|---|---|---|
| | 1.4 | 7 | 15 | 30 |
| % Glc | 95.0 | 95.3 | 96.2 | 96.4 |
| % Xyl | 4.8 | 4.5 | 3.9 | 3.3 |
| % Man | 0.2 | 0.2 | 0.3 | 0.3 |
| Vis cp | 24.4 | 23.9 | 25.1 | 20.5 |
| % R10 | NT | 99.5 | NT | NT |
| % S10–S18 | NT | 0.0 | NT | 0.1 |
| % S18 | NT | 0.5 | NT | 0.4 |
| Yield | 80.7 | 80.3 | 79.1 | 79.2 |

*(Fiber = BHWK, unrefined -- all fractions, dried to constant weight at 105° C.; treatment = 10% NaOH/Xylanase/10% NaOH)

As can be seen from reviewing the data in Tables 1C1 and 1C2, the xylan levels ranged from 3.3% to 5.0%. Thus, a very low xylanase charge of 30 or fewer units was insufficient to remove the xylan to a desirably low level of 2.6% or lower, even though a 3-stage treatment comprising a first alkali extraction stage, followed by a xylanase treatment stage, followed by a second alkali extraction stage was employed. Accordingly, such low charges of xylanase are ineffective for producing a pulp with a desirably low xylan level.

EXAMPLE 2

BHWK

The 3-stage procedure of Samples 1C1 and 1C2 was repeated, except that this time for the xylanase stage, xylanase charges of either 100 U/g, 150 U/g, 400 U/g, or 800 U/g were employed.

The properties of the resultant pulps are summarized below in Table 2a (in which the xylanase treatment stage was conducted for 1 hour) and in Table 2b (in which the xylanase treatment stage was conducted for 3 hours).

TABLE 2a*

Properties of Pulp after 3-Stage Treatment

| | U/g of Xylanase in 1 hr Stage | | | |
|---|---|---|---|---|
| | 100 | 150 | 400 | 800 |
| % Glc | 97.2 | 97.6 | 98.4 | 98.2 |
| % Xyl | 2.5 | 2.2 | 1.4 | 1.6 |
| % Man | 0.3 | 0.2 | 0.2 | 0.2 |
| Vis cp | 17.4 | 13.2 | 7.7 | 8.0 |
| % R10 | 99.5 | 99.5 | 99.3 | NT |
| % S10–S18 | 0.2 | 0.1 | 0.2 | NT |
| % S18 | 0.3 | 0.4 | 0.5 | NT |
| % Yield | 78.3 | 76.4 | 75.3 | 75.3 |

*(Fiber = BHWK, unrefined -- all fractions, dried to constant weight at 105° C.; treatment = 10% NaOH/Xylanase/10% NaOH)

TABLE 2b*

Properties of Pulp after 3-Stage Treatment

| | U/g of Xylanase in 3 hr Stage | | | |
|---|---|---|---|---|
| | 100 | 150 | 400 | 800 |
| % Glc | 97.1 | 98.2 | 98.4 | 98.0 |
| % Xyl | 2.6 | 1.7 | 1.5 | 1.6 |
| % Man | 0.3 | 0.1 | 0.1 | 0.4 |
| Vis cp | 21.7 | 13.6 | 9.5 | 7.5 |
| % R10 | 99.5 | NT | 99.4 | NT |
| % S10–S18 | 0.1 | NT | 0.0 | NT |
| % S18 | 0.4 | NT | 0.6 | NT |
| % Yield | 78.7 | 76.2 | 74.6 | 74.1 |

*(Fiber = BHWK, unrefined -- all fractions, dried to constant weight at 105° C.; treatment = 10% NaOH/Xylanase/10% NaOH)

As can be seen from reviewing the data in Tables 2a and 2b, the 3-stage treatment comprising a first alkali extraction stage, followed by a xylanase treatment stage, followed by a second alkali extraction stage produced dissolving pulps with desirable characteristics. Specifically, the xylanase treatment stage was performed for 1 hour or for 3 hours and the charge ranged from 100 U/g of fiber to 800 U/g of fiber, which resulted in dissolving pulps having all three of the following desirable properties: an acceptably low xylan content ranging from 1.5% to 2.6%, an acceptably low mannan content ranging from 0.1% to 0.4%, and an acceptably high viscosity ranging from 7.5 cp to 21.7 cp. Additionally, it is noted that desirable yields ranging from 74.1% to 78.7% were obtained.

EXAMPLE 3

Comparisons/Envelope Clippings or White Ledger

Samples 3A1 and 3A2. Samples were tested according to the procedure of Samples 1A1 and 1A2 above, except as follows. Instead of BHWK for the fiber, employed was recycled paper that was either unprinted envelope clippings or unprinted white ledger, all of which were screened to produce fiber fractions>100 mesh.

The properties, prior to treatment, for a sample of the white envelope clippings and for a sample of the white ledger were as follows:

| Properties of Fiber Prior to Treatment* | | |
|---|---|---|
| | Envelope Clippings | White Ledger |
| % Glc | 84.3 | 83.6 |
| % Xyl | 12.2 | 13.7 |
| % Man | 3.5 | 2.7 |
| Vis cp | 12.3 | 17.8 |
| % R10 | 86.2 | 89.5 |
| % S10–S18 | 2.3 | 2.2 |
| % S18 | 11.6 | 8.3 |
| Yield | 100 | 100 |

*(Fiber = fractions > 100 mesh)

Also, instead of conducting both 1-stage treatments and 2-stage treatments on samples as in the procedure of Samples 1A1 and 1A2 above, selected treatments of only 1 stage were conducted on samples of fiber as follows: (1) a xylanase treatment stage, (2) an alkali extraction stage with 8% NaOH, or (3) an alkali extraction stage with 10% NaOH. Also, for all samples in which a xylanase treatment stage was performed, the xylanase charge was held constant at 200 U/g fiber for a reaction time of 3 hours.

The results are summarized below in Table 3A1 (in which the fiber was envelope clippings) and in Table 3A2 (in which the fiber was white ledger).

TABLE 3A1

(Comparisons)*
Properties of Pulp after Selected Stage of Treatment

| | Type of Treatment | | |
|---|---|---|---|
| | Xylanase | 8% NaOH | 10% NaOH |
| % Glc | 86.0 | 94.8 | 95.9 |
| % Xyl | 10.4 | 2.5 | 2.4 |
| % Man | 3.6 | 2.7 | 1.7 |
| Vis cp | 12.3 | 13.5 | 13.2 |
| % R10 | 86.3 | 98.3 | 99.3 |
| % S10–S18 | 3.0 | −0.5 | −0.1 |
| % S18 | 10.7 | 2.2 | 0.8 |
| % Yield | 95.6 | 84.3 | 80.7 |

*(Fiber = envelope clippings, fractions > 100 mesh; xylanase charge = 200 U/g of fiber for 3 hrs)

TABLE 3A2

(Comparisons)*
Properties of Pulp after Selected Stage of Treatment

| | Type of Treatment | | |
|---|---|---|---|
| | Xylanase | 8% NaOH | 10% NaOH |
| % Glc | 86.5 | 94.0 | 95.2 |
| % Xyl | 10.8 | 3.8 | 3.8 |
| % Man | 2.7 | 2.2 | 1.1 |
| Vis cp | 17.5 | 24.2 | 23.7 |
| % R10 | 88.5 | 98.7 | 9.4 |
| % S10–S18 | 2.9 | −0.4 | −0.2 |
| % S18 | 8.6 | 1.7 | 0.8 |
| % Yield | 98.6 | 85.5 | 84.4 |

*(Fiber = white ledger; fractions > 100 mesh; xylanase charge = 200 U/g of fiber for 3 hrs)

As can be seen from reviewing the data in Tables 3A1 and 3A2, performing only 1 stage for the treatment of the fiber resulted in the pulp having unacceptably high levels for both xylan and mannan, or for one of the xylan or mannan. Pulp could not be obtained where both the xylan and the mannan had values, respectively, of 2.6% or lower and 1.5% or lower.

Samples 3B1 and 3B2. Fiber that was either unprinted envelope clippings or unprinted white ledger was employed for these samples, and all were screened to give fiber fractions>100 mesh.

The fiber was subjected to a 3-stage treatment comprising a first alkali extraction stage performed with 8% NaOH, followed by a xylanase treatment stage, followed by a second alkali extraction stage performed with 8% NaOH. The xylanase treatment stage was performed for either 1 hour or 3 hours, and xylanase charges of either 100 U/g or 200 U/g were employed.

The properties of the resultant pulps are summarized below in Table 3B1 (in which the fiber was envelope clippings) and in Table 3B2 (in which the fiber was white ledger).

TABLE 3B1

(Comparisons)*
Properties of Pulp after 3-Stage Treatment

| | Xylanase in 1 hr Stage | | Xylanase in 3 hr Stage | |
|---|---|---|---|---|
| | 100 U/g | 200 U/g | 100 U/g | 200 U/g |
| % Glc | 96.3 | 96.2 | 96.9 | 96.8 |
| % Xyl | 1.1 | 1.1 | 0.9 | 0.9 |
| % Man | 2.6 | 2.7 | 2.1 | 2.3 |
| Vis cp | 9.8 | 10.3 | 10.8 | 9.9 |
| % R10 | 98.1 | 98.0 | 98.2 | 98.0 |
| % S10–S18 | −0.1 | −0.1 | −0.2 | 0.0 |
| % S18 | 2.0 | 2.1 | 2.0 | 2.0 |
| % Yield | 82.2 | 81.5 | 81.1 | 80.9 |

*(Fiber = envelope clippings, fractions > 100 mesh; xylanase charge = 100 U/g or 200 U/g of fiber for 1 hr or 3 hrs)

TABLE 3B2

(Comparisons)*
Properties of Pulp after 3-Stage Treatment

| | Xylanase in 1 hr Stage | | Xylanase in 3 hr Stage | |
|---|---|---|---|---|
| | 100 U/g | 200 U/g | 100 U/g | 200 U/g |
| % Glc | 96.0 | 96.6 | (97.7) | 97.0 |
| % Xyl | 1.7 | 1.4 | (1.1) | 1.2 |
| % Man | 2.4 | 2.0 | (1.2) | 1.8 |
| Vis cp | 13.6 | 12.9 | (16.2) | 14.3 |
| % R10 | 98.5 | 98.4 | (98.5) | 98.5 |
| % S10–S18 | −0.3 | −0.2 | (−0.2) | 0.2 |
| % S18 | 1.8 | 1.8 | (1.7) | 1.7 |
| % Yield | 83.6 | 83.3 | (83.3) | 82.5 |

*(Fiber = white ledger; fractions > 100 mesh; xylanase charge = 100 U/g or 200 U/g of fiber for 1 hr or 3 hrs)

As can be seen from reviewing the data in Tables 3B1 and 3B2, the resultant pulps had a viscosity in the desired range of 7.5 cp or higher. However, except for the results denoted inside of () for the experiment in the third column of Table 3B2, even though employed on the fiber was a 3-stage treatment (i.e., a first alkali extraction stage, followed by a xylanase treatment stage, followed by a second alkali extraction stage), it appears that small amounts of xylanase charge of either 100 or 200 U/g for either 1 hour or 3 hours, sandwiched between a first and a second alkali stage with each alkali stage using only 8% NaOH for only 1 hour, is not sufficient for the resultant pulp to exhibit both the desired xylan content of 2.6% or under and the desired mannan content of 1.5% or under.

Specifically, the xylan content ranged from 1.4% to 1.7% and so was in the desired range of 2.6% or under, but the mannan content was at best 1.8% and ranged as high as 2.7% and so was above the desired range of 1.5% or under.

However, it is particularly noted that the resultant pulp having its properties denoted inside of ( ) in the third column of Table 3B2 and the method to make that pulp are clearly within the scope of the present invention. While it is intended not to be bound to any theory, it is believed that a 3-stage treatment on white ledger (where the xylanase treatment stage used a small charge of xylanase of 100 U/g for 3 hours and was sandwiched between a first and a second alkali stage with each alkali stage using only 8% NaOH for only 1 hour) worked to produce a dissolving pulp with desirable properties (i.e., having both the xylan content and the mannan content be desirably low, i.e., 1.1% xylan and 1.2% mannan as well as having a desirably high viscosity of 16.2 cp) for the following reasons.

The two cold alkali stages and the xylanase treatment stage were performed near optimum conditions for white ledger as the fiber source. In other words, comparing these results from the third column with the results from the fourth column (the xylanase charge in the fourth column is double that in the third column) illustrates that doubling the xylanase charge, when the alkali was only 8%, probably damaged that cellulose so that the resultant mannan content was escalated to the undesirably high 1.8% reported the fourth column.

EXAMPLE 4

Envelope Clippings or White Ledger

The procedure of Example 2 was repeated, so that the fiber was subjected to a 3-stage treatment comprising a first alkali extraction stage performed with 10% NaOH, followed by a xylanase treatment stage, followed by a second alkali extraction stage performed with 10% NaOH, except for the following.

The fiber was either screened envelope clippings>100 mesh or screened white ledger>100 mesh. Also, the xylanase treatment stage was performed for either 1 hour or 3 hours, and xylanase charges of either 100 U/g or 200 U/g were employed.

The results are summarized below in Table 4a (in which the fiber was envelope clippings) and Table 4b (in which the fiber was white ledger).

TABLE 4a*

Properties of Pulp after 3-Stage Treatment

| | Xylanase in 1 hr Stage | | Xylanase in 3 hr Stage | |
|---|---|---|---|---|
| | 100 U/g | 200 U/g | 100 U/g | 200 U/g |
| % Glc | 98.0 | 98.1 | 97.9 | (95.8) |
| % Xyl | 0.6 | 0.6 | 0.8 | (1.5) |
| % Man | 1.4 | 1.4 | 1.3 | (2.7) |
| Vis cp | 9.7 | 8.7 | 9.5 | (8.3) |
| % R10 | 99.2 | 99.3 | 99.3 | (99.3) |
| % S10–S18 | −0.1 | −0.1 | −0.1 | (−0.1) |
| % S18 | 0.9 | 0.8 | 0.8 | (0.8) |
| % Yield | 78.6 | 78.9 | 78.0 | (78.5) |

*(Fiber = envelope clippings, fractions > 100 mesh; xylanase charge = 100 U/g or 200 U/g of fiber for 1 hr or 3 hrs)

TABLE 4b*

Properties of Pulp after 3-Stage Treatment

| | Xylanase in 1 hr Stage | | Xylanase in 3 hr Stage | |
|---|---|---|---|---|
| | 100 U/g | 200 U/g | 100 U/g | 200 U/g |
| % Glc | (97.0) | 98.0 | 97.1 | 97.9 |
| % Xyl | (1.4) | 1.0 | 1.6 | 1.4 |
| % Man | (1.7) | 1.1 | 1.3 | 0.8 |
| Vis cp | (13.6) | 11.6 | 15.8 | 12.5 |
| % R10 | (99.3) | 99.3 | 99.4 | 99.3 |
| % S10–S18 | (−0.3) | −0.1 | −0.1 | −0.3 |
| % S18 | (1.0) | 0.8 | 0.7 | 1.0 |
| % Yield | (81.8) | 81.6 | 80.9 | 80.8 |

*(Fiber = white ledger, fractions > 100 mesh; xylanase charge = 100 U/g or 200 U/g of fiber for 1 hr or 3 hrs)

As can be seen from reviewing the data in Tables 4a and 4b, except for the result pulp having its properties denoted inside of ( ) in the right-hand column of Table 4a and except for the resultant pulp having its properties denoted inside of ( ) in the left-hand column of Table 4b, the remaining resultant pulps exhibited both the desired xylan content of 2.6% or under and the desired mannan content of 1.5% or under, as well as a high viscosity above the desirable 7.5 cp or higher. Specifically, the xylan content ranged from 0.6% to 1.6%, and the mannan content ranged from 0.8% to 1.4%. Also, the viscosity ranged from 8.3 cp to 15.8 cp.

However, in particular with regard to the 2 resultant pulps having their properties respectively denoted inside of ( ) in the right-hand column of Table 4a and inside of ( ) in the left-hand column of Table 4b, while it is intended not to be bound to any theory, it is believed that a 3-stage treatment on envelope clippings (where the xylanase treatment stage used a small charge of xylanase of 200 U/g for 3 hours) and on white ledger (where the xylanase treatment stage used a small charge of xylanase of 100 U/g for 1 hour) and each respective xylanase stage was sandwiched between a first and a second alkali stage (where each alkali stage used 10% NaOH for 1 hour) failed to produce a desirable dissolving pulp (having both the xylan content and the mannan content be desirably low, i.e., the mannan was, respectively, 2.7% or 1.7%) for the following reasons.

The particular samples upon which the 3 stage treatment was performed happened to have a higher softwood content than that of the samples in general and therefore a higher mannan content that the mannan content reported above at the beginning of Example 3 for the tested samples of envelope clippings and white ledger. Assuming that the particular samples did have a higher softwood content, then, as noted above, a mannanase treatment may be needed in addition to the xylanase treatment.

It will be understood that various details of the invention may be changed without departing from the scope of the invention. Furthermore, the foregoing description is for the purpose of illustration only, and not for the purpose of limitation--the invention being defined by the claims.

What is claimed is:

1. A method for making dissolving pulp from a cellulosic fiber source consisting essentially of:
   treating the cellulosic fiber source with a 3-stage sequence of a first alkali extraction stage, a xylanase treatment stage, and a second alkali extraction stage,
   (a) wherein the cellulosic fiber source is selected from the group consisting of recycled paper products made from hardwood fiber, recycled paper products made from a mixture of hardwood fiber and softwood fiber, and combinations thereof, and wherein the recycled paper products are selected from the group consisting of waste paper from unprinted envelopes, waste paper from de-inked envelopes, waste paper from unprinted ledger paper, waste paper from de-inked ledger paper, and combinations thereof, and (b) wherein each of the first and the second alkali extraction stages is conducted with aqueous sodium hydroxide at a temperature from about 0° C. to about 23° C. and the xylanase stage is conducted at a temperature from about 40° C. to about 70° C., and wherein each of the 3 stages is conducted for a sufficient time and the xylanase stage is conducted with a charge of sufficient unties of activity of xylanase per gram of cellulosic fiber source to obtain dissolving pulp having selected properties of:
   (i) a resistance of about 97.0% or greater to extraction with 10% sodium hydroxide in water,
   (ii) a xylan content of about 2.6% or less by weight,
   (iii) a mannan content of about 1.5% or less by weight, and
   (iv) a cuene viscosity of about 7.5 or greater centipoise.

2. The method of claim 1, wherein each of the first and the second alkali extraction stages is conducted for a time from about 0.5 to about 2 hours, at a temperature from about 19 to about 21° C., and with aqueous sodium hydroxide that is about 5 to about 15% by weight sodium hydroxide in water, and the xylanase stage is conducted for a time from about 0.5 to about 3.5 hours, at a temperature of from about 50 to about 60° C., at a pH of about 5.0 or higher, and with a charge of xylanase of about 100 to about 800 units of activity of xylanase per gram of fiber source.

3. The method of claim 2, wherein the aqueous sodium hydroxide is about 10% by weight sodium hydroxide in water and the time is about 1 hour for at least one of the first and the second alkali extraction stages, and the xylanase charge is about 150 to about 750 units of activity of xylanase per gram of fiber source for the xylanase treatment stage.

4. The method of claim 1, wherein the xylan content is about 2.3% or less, the mannan content is about 1.3% or less, and the viscosity is about 8.5 centipoise or greater.

5. The method of claim 4, wherein the xylan content is about 2.0% or less, the mannan content is about 1.0% or less, and the viscosity is about 9.0 centipoise or greater.

6. A method for making dissolving pulp from a cellulosic fiber source consisting essentially of:
   (A) treating a cellulosic fiber source containing hardwood fiber with a first cold alkali extraction stage, followed by a xylanase treatment stage, followed by a second cold alkali extraction stage,
      (i) wherein the cellulosic fiber source is selected from the group consisting of recycled paper products made from hardwood fiber, recycled paper products made from a mixture of hardwood fiber and softwood fiber, and combinations thereof, and wherein the recycled paper products are selected from the group consisting of waste paper from unprinted envelopes, waste paper from de-inked envelopes, waste paper front unprinted ledger paper, waste paper from de-inked ledger paper, and combinations thereof, and
      (ii) wherein each of the first and the second alkali extraction stages is conducted for a time from about 0.5 to about 2 hours, at a temperature from about 19 to about 21° C., and with aqueous sodium hydroxide that is about 5 to about 15% by weight sodium hydroxide in water, and wherein the zylanase treatment stage is conducted for a time from about 0.5 to about 3.5 hours, at a temperature from about 50 to about 60° C., and with a charge of xylanase of about 100 to about 800 units of activity of xylanase per gram of cellulosic fiber source; and
   (B) obtaining dissolving pulp having selected properties of:
      (i) a resistance of about 97% or greater to extraction with aqueous sodium hydroxide that is about 10% sodium hydroxide in water,
      (ii) a xylan content of about 2.5% by weight or less,
      (iii) a mannan content of about 1.3% by weight or less, and
      (iv) a cuene viscosity of about 7.5 or greater centipoise.

7. The method of claim 6, wherein the aqueous sodium hydroxide is about 10% by weight sodium hydroxide in water and the time is about 1 hour for at least one of the first and the second alkali extraction stages, and the xylanase charge is about 150 to about 750 units of activity of xylanase per gram of fiber source for the xylanase treatment stage.

8. The method of claim 6, wherein the xylan content is about 2.3% or less, the mannan content is about 1.3% or less, and the viscosity is about 8.5 centipoise or greater.

9. The method of claim 8, wherein the xylan content is about 2.0% or less, the mannan content is about 1.0% or less, and the viscosity is about 9.0 centipoise or greater.

10. A method for making dissolving pulp from a cellulosic fiber source consisting essentially of:
   (A) treating a cellulosic fiber source containing hardwood fiber, the fiber source having been previously dried at lest once to a constant weight, with a first cold alkali extraction stage, followed by a xylanase treatment stage, followed by a second cold alkali extraction stage,
      (i) wherein the cellulosic fiber source is selected from the group consisting of recycled paper products made from hardwood fiber, recycled paper products made from a mixture of hardwood fiber and softwood fiber, and combinations thereof, and wherein the recycled paper products are selected from the croup consisting of waste paper from unprinted envelopes, waste paper from de-inked envelopes, waste paper from unprinted ledger paper, waste paper from de-inked ledger paper, and combinations thereof, and
      (ii) wherein each of the first and the second alkali extraction stages is conducted for a time from about 0.5 to about 2 hours, at a temperature from about 19 to about 21° C. and with aqueous sodium hydroxide that is about 5 to about 15% by weight sodium hydroxide in water, and wherein the zylanase treatment stage is conducted for a time from about 0.5 to about 3.5 hours, at a temperature from about 50 to about 60° C., and with a charge of xylanase of about 100 to about 800 units of activity of xylanase per gram of cellulosic fiber source; and
   (B) obtaining dissolving pulp having selected properties of:
      (i) a resistance of about 97% or greater to extraction with aqueous sodium hydroxide that is about 10% sodium hydroxide in water,
      (ii) a xylan content of about 2.5% by weight or less,
      (iii) a mannan content of about 1.3% by weight or less, and
      (iv) a cuene viscosity of about 7.5 or greater centipoise.

11. A method for making dissolving pulp from a cellulosic fiber source consisting essentially of:

(A) treating a cellulosic fiber source containing hardwood fiber, the fiber source having been previously made into a pulp of about 1 to about 12% consistency, and the pulp is treated with a first cold alkali extraction stage, followed by a xylanase treatment stage, followed by a second cold alkali extraction stage,
  (i) wherein the cellulosic fiber source is selected from the group consisting of recycled paper products made from hardwood fiber, recycled paper products made from a mixture of hardwood fiber and softwood fiber, and combinations thereof, and wherein the recycled paper products are selected from the group consisting of waste paper from unprinted envelopes, waste paper from de-inked envelopes, waste paper from unprinted ledger paper, waste paper from de-inked ledger paper, and combinations thereof, and
  (ii) wherein each of the first and the second alkali extraction stages is conducted for a time from about 0.5 to about 2 hours, at a temperature from about 19 to about 21° C., and with aqueous sodium hydroxide that is about 5 to about 15% by weight sodium hydroxide in water, and wherein the zylanase treatment stage is conducted for a time from about 0.5 to about 3.5 hours, at a temperature from about 50 to about 60° C., and with a charge of xylanase of about 100 to about 800 units of activity of xylanase per gram of cellulosic fiber source; and
(B) obtaining dissolving pulp having selected properties of:
  (i) a resistance of about 97% or greater to extraction with aqueous sodium hydroxide that is about 10% sodium hydroxide in water,
  (ii) a xylan content of about 2.5% by weight or less,
  (iii) a mannan content of about 1.3% by weight or less, and
  (iv) a cuene viscosity of about 7.5 or greater centipoise.

12. A method for making dissolving pulp from a cellulosic fiber source consisting essentially of:

(A) treating a cellulosic fiber source containing hardwood fiber, the fiber having been separated into fractions, and the fiber fraction of greater than 100 mesh is treated with a first cold alkali extraction stage, followed by a xylanase treatment stage, followed by a second cold alkali extraction stage,
  (i) wherein the cellulosic fiber source is selected from the group consisting of recycled paper products made from hardwood fiber, recycled paper products made from a mixture of hardwood fiber and softwood fiber, and combinations thereof, and wherein the recycled paper products are selected from the group consisting of waste paper from unprinted envelopes, waste paper from de-inked envelopes, waste paper from unprinted ledger paper, waste paper from de-inked ledger paper, and combinations thereof, and
  (ii) wherein each of the first and the second alkali extraction stages is conducted for a time from about 0.5 to about 2 hours, at a temperature from about 19 to about 21° C., and with aqueous sodium hydroxide that is about 5 to about 15% by weight sodium hydroxide in water, and wherein the zylanase treatment stage is conducted for a time from about 0.5 to about 3.5 hours, at a temperature front about 50 to about 60° C., and with a charge of xylanase of about 1000 to about 800 units of activity of xylanase per gram of cellulosic fiber source; and
(B) obtaining dissolving pulp having selected properties of:
  (i) a resistance of about 97% or greater to extraction with aqueous sodium hydroxide that is about 10% sodium hydroxide in water,
  (ii) a xylan content of about 2.5% by weight or less,
  (iii) a mannan content of about 1.3% by weight or less, and
  (iv) a cuene viscosity of about 7.5 or greater centipoise.

* * * * *